(12) United States Patent
Schemel et al.

(10) Patent No.: US 8,657,079 B2
(45) Date of Patent: Feb. 25, 2014

(54) ELECTRIC PARKING BRAKE

(75) Inventors: Hans-Peter Schemel, Buehl (DE); Helmut Meier, Renchen (DE); Hartmut Ochs, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 12/994,962

(22) PCT Filed: Mar. 27, 2009

(86) PCT No.: PCT/EP2009/053646
§ 371 (c)(1),
(2), (4) Date: May 16, 2011

(87) PCT Pub. No.: WO2009/144052
PCT Pub. Date: Dec. 3, 2009

(65) Prior Publication Data
US 2011/0203881 A1  Aug. 25, 2011

(30) Foreign Application Priority Data

May 27, 2008  (DE) .......................... 10 2008 001 990

(51) Int. Cl.
*F16D 55/00*  (2006.01)
(52) U.S. Cl.
USPC ..... 188/71.1; 188/72.7; 188/72.8; 188/73.46; 188/156; 188/157; 188/162; 188/265
(58) Field of Classification Search
USPC ........... 188/71.1, 72.7, 156, 157, 73.46, 72.8, 188/162, 265
See application file for complete search history.

(56) References Cited

U.S. PATENT DOCUMENTS

| 3,338,349 | A  | * | 8/1967  | Klinkenberg et al. | ........ 188/161 |
| 7,721,853 | B2 | * | 5/2010  | Chittka | ......................... 188/72.8 |
| 2006/0019144 | A1 | * | 1/2006 | Hidaka et al. | ................... 429/38 |
| 2007/0068746 | A1 |   | 3/2007 | Chittka | |
| 2007/0102249 | A1 | * | 5/2007 | Ullmann et al. | ............. 188/72.7 |
| 2007/0209888 | A1 | * | 9/2007 | Adachi | ....................... 188/72.7 |
| 2009/0283371 | A1 |   | 11/2009 | Winkler et al. | |

FOREIGN PATENT DOCUMENTS

| CN | 1602394 |    | 3/2005 |
| CN | 1884842 |    | 12/2006 |
| EP | 1319859 | A1 | 6/2003 |
| WO | 2007/138026 | A1 | 12/2007 |
| WO | 2008/037738 |    | 4/2008 |

OTHER PUBLICATIONS

PCT/EP2009/053646 International Search Report.

* cited by examiner

*Primary Examiner* — Robert A Siconolfi
*Assistant Examiner* — Mahbubur Rashid
(74) *Attorney, Agent, or Firm* — Michael Best & Friedrich LLP

(57) ABSTRACT

The invention relates to an electric parking brake, comprising a motor-gearing unit (2) with a drive output shaft (3), wherein the motor-gearing unit (2) generates a rotation of the drive output shaft (3), and comprising a spindle device (4) having a spindle (5) and a nut (6), wherein the spindle device (4) converts the rotation of the drive output shaft (3) into an axial movement of the nut (6) in the axial direction (X-X), wherein the spindle (5) is connected in a positively locking manner to the drive output shaft (3), the spindle (5) is centered on the drive output shaft (3), and the spindle is mounted in a brake caliper (7).

10 Claims, 1 Drawing Sheet

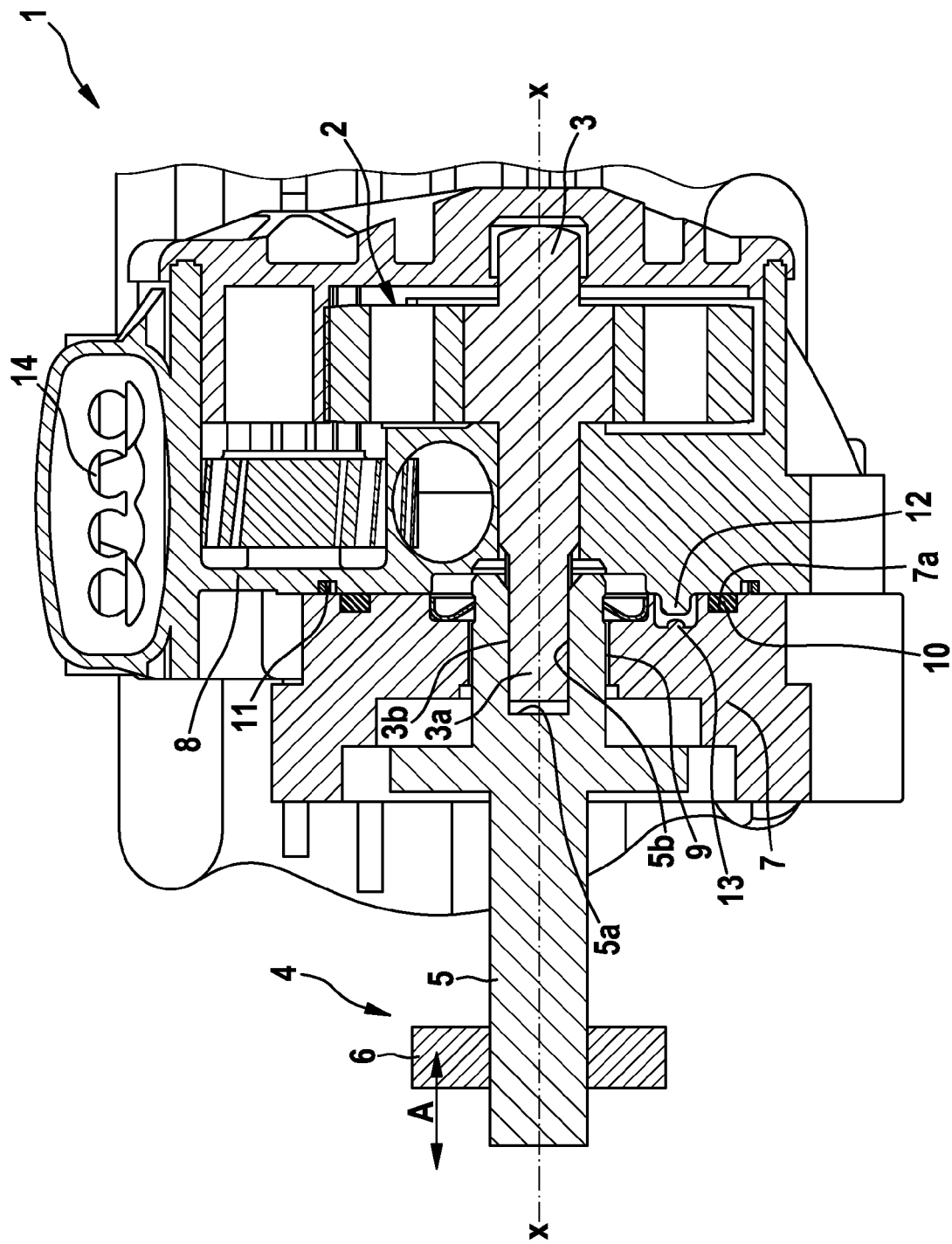

ELECTRIC PARKING BRAKE

BACKGROUND OF THE INVENTION

The present invention relates to an electric parking brake having an improved interface between a brake caliper and a drive for activating the parking brake.

In recent times, electric parking brakes, which are intended to replace the customary Bowden cable handbrakes, are being increasingly installed in vehicles. What are referred to as motor/gear units, which have an electric motor and a transmission for changing the rotational speed in a compact design, are frequently used as a drive for activating the electric handbrake by means of an actuator, for example a spindle device. Such motor/gear units have previously been centered radially by means of an outer collar on the brake caliper and a centering internal diameter on a housing of the motor/gear unit. In this context, it has been found that this design has the disadvantage of stress, in particular during mounting, since overdeterminedness occurs as a result of coaxiality errors between the centering collar and a spindle and centering on the centering internal diameter of the motor/gear unit and the output shaft. As a result, during mounting stresses occur which give rise to adverse effects during the transmission of torque since said stresses significantly reduce the efficiency and also durability, and also have sealing problems between the brake caliper and the motor/gear unit.

SUMMARY OF THE INVENTION

The electric parking brake of the invention has, in contrast, the advantage that while having a simple design and involving simple, cost-effective mounting it brings about radial centering between a brake caliper and a motor/gear unit only by means of torque-transmitting parts. Therefore, overdeterminedness of the centering, as in the prior art, cannot occur. This is achieved according to the invention in that a spindle is connected axially directly to an output shaft of the motor/gear unit. In this context, the spindle is centered on the output shaft and is mounted in a brake caliper. An interface can therefore be implemented between the brake caliper and the motor/gear unit by means of a direct connection of the spindle to the output shaft and bearing of the spindle in the brake caliper. This makes it possible to avoid stressing of the components during the mounting of the transmission on the brake caliper due to unfavorable tolerance additions.

The spindle is preferably mounted radially and axially in the brake caliper by means of a bearing. The motor/gear unit can therefore be mounted centrally with respect to an axial direction, directly by means of the output shaft and the spindle.

The attachment of the motor/gear unit to the brake caliper is preferably carried out by means of screw connections.

In order to ensure that the device can be mounted particularly easily, the output shaft preferably comprises an existing end region which engages in a central opening in the spindle. In this context, a positively locking connection is preferably provided between the output shaft and the spindle. The positively locking connection is preferably a toothing arrangement or alternatively also a quadrilateral connection or polygonal connection.

According to a further preferred configuration of the present invention, a sealing element is provided, which seals off a gap running in the radial direction, the sealing element having a sealing face directed in the axial direction. This makes it possible to make available a defined sealing face in the axial direction, which forms a seal between the brake caliper and the motor/gear unit. This ensures a seal which is improved compared to the prior art since the arrangement of the seal at the gap running in the radial direction avoids non-uniform application of force owing to incorrect centering.

Furthermore, the electric parking brake according to the invention preferably has a corrosion-relief groove, which avoids the occurrence of gap corrosion at the radial sealing gap. The corrosion-relief groove is arranged radially outside the sealing element here. The geometric formation of the corrosion-relief groove makes it possible to avoid corrosion occurring directly at the sealing element since when corrosion occurs it occurs at the corrosion-relief groove. The corrosion-relief groove therefore protects against corrosion occurring in the sealing element region and therefore giving rise to a leak.

According to the invention, an elastic O-ring or a fluid seal or a hose ring section is preferably used as the sealing element. Other types of seal are also possible here.

In order to permit simple mounting of the sealing element, a groove for holding the sealing element is preferably provided in the brake caliper. This groove can alternatively also be formed in a housing component of the motor/gear unit.

The housing component of the motor/gear unit is also preferably connected in a rotationally fixed fashion to the brake caliper by means of an anti-rotation device. The anti-rotation device comprises here, in particular, an axially protruding tappet and a recess which is of corresponding design. In this context, the tappet can either be provided in the brake caliper or in the housing component of the motor/gear unit. The recess which is of corresponding design can then be correspondingly provided in the opposing component.

BRIEF DESCRIPTION OF THE DRAWINGS

An electric parking brake according to an exemplary embodiment of the invention will be described below with reference to the accompanying drawing, in which:

FIG. 1 is a schematic sectional view through an electric parking brake according to an exemplary embodiment of the invention.

DETAILED DESCRIPTION

An electric parking brake 1 according to an exemplary embodiment of the invention will be described below with reference to FIG. 1.

As is apparent from FIG. 1, the electric parking brake 1 comprises a motor/gear unit 2, which is illustrated only schematically in FIG. 1. The motor/gear unit 2 comprises a compact electric motor and a gear unit, which comprises a plurality of gear wheel elements. The motor/gear unit 2 also comprises an output shaft 3 at which an output torque is output. As is apparent from FIG. 1, the output shaft 3 is arranged in an axial direction X-X of the electric parking brake 1. A region 3a with a relatively small diameter is formed at the free end of the output shaft 3. A toothing arrangement 3b, which is in engagement with a toothing arrangement 5b of a spindle 5, is provided at this region 3a. The toothing arrangement 5b is of complementary design to the toothing arrangement 3b here in an axial central recess 5a of the spindle 5. The spindle 5 is part of a spindle device 4, which also comprises a nut 6. This arrangement ensures that the spindle 5 rotates together with the output shaft 3, so that a nut 6, which is held in a rotationally fixed but axially movable fashion, can move in the direction of the double arrow A in order to convert the rotational movement of the spindle 5 into a translatory movement. A direction of movement is dependent on a rotational direction of the spindle 5 here.

The spindle 5 is mounted concentrically with respect to the central axis X-X by means of a bearing 9 in a brake caliper 7. In order to make available a design which is as compact as possible, the bearing 9 is arranged radially outside the connection here, between the spindle 5 and the output shaft 3. The brake caliper 7 is located adjacent to a housing component 8 of the motor/gear unit 2 here, as a result of which, as is apparent from FIG. 1, a gap which is directed in the radial direction is formed between the housing component 8 and the brake caliper 7. An annular groove 7a, for holding a seal 10, is provided in the brake caliper 7. In this exemplary embodiment, the seal 10 is an O-ring seal. A corrosion-relief groove 11, which is also provided in such a way that it runs around in an annular shape, is formed in the housing component 8, at a position somewhat radially outside the groove 7a. The corrosion-relief groove 11 has here the function of providing forced corrosion at the region between the brake caliper 7 and the housing component 8 so that the occurrence of corrosion in the region of the seal 10 is prevented. As a result, corrosion at the seal can be prevented over the entire service life of the electric parking brake 1.

In order to protect against rotation between the brake caliper 7 and the housing component 8, a tappet 12 which protrudes in the axial direction X-X is formed on the housing component 8. An axial recess 13 in the form of a drill hole is provided in the brake caliper 7 in a way which is complementary to the above. When the electric parking brake 1 is mounted, the tappet 12 and the recess 13 can also be used for pre-centering. The reference symbol 14 denotes an electric plug connection at the motor/gear unit.

As is apparent from FIG. 1, the invention therefore provides for centering between the brake caliper 7 and the motor/gear unit 2 only by means of the torque-transmitting parts, specifically the output shaft 3 and the spindle 5. This avoids overdeterminedness of the system, so that no undesired tolerance addition of possibly present fabrication tolerances is possible. In addition, the invention makes available defined sealing faces between the brake caliper 7 and the housing component 8 of the motor/gear unit 2 so that a sealing face which is directed in the axial direction is provided between these two components. It is to be noted here that the seal 10 could, of course, also be arranged in a groove which is provided in the housing component 8. Furthermore, the corrosion-relief groove 11 can also alternatively be provided in the brake caliper 7.

According to the invention, no stresses therefore occur between the motor/gear unit and the spindle device 4 since these two assemblies are centered directly by means of the torque-transmitting parts. As a result, according to the invention it is possible to make available an improved interface between the motor/gear unit 2 and the spindle device 4. According to the invention it is possible, in particular, to dispense with the provision of an additional centering internal diameter at the housing of the motor/gear unit 2. It is also possible to dispense here with the provision of a collar at the brake caliper 7 for centering. In addition, according to the invention it is possible for easy-to-manufacture axial sealing faces which run radially outward to be made available between the brake caliper 7 and the housing component 8.

The invention claimed is:

1. An electric parking brake (1) comprising:
a motor/gear unit (2) having an output shaft (3), a brake caliper (7) and a housing component (8), wherein the motor/gear unit (2) generates rotation of the output shaft (3),
a spindle device (4) having a spindle (5) and a nut (6), wherein the spindle device (4) converts the rotation of the output shaft (3) into an axial movement in the axial direction (X-X) of the nut (6), and
a sealing element (10) forming a seal at a gap running in the radial direction, between the brake caliper (7) and the housing component (8) of the motor/gear unit (2),
characterized in that
the spindle (5) is connected directly to the output shaft (3) in the axial direction (X-X),
the spindle (5) is centered on the output shaft (3),
the spindle is mounted in the brake caliper (7),
wherein the sealing element (10) has a sealing face which is directed in the axial direction (X-X), and
a corrosion-relief groove (11) is arranged in the radial direction outside the sealing element (10).

2. A parking brake as claimed in claim 1, characterized in that the spindle (5) is mounted radially and axially in the brake caliper (7) by means of a bearing (9).

3. A parking brake as claimed in claim 1, characterized in that a positively locking connection, is provided between the output shaft (3) and the spindle (5).

4. A parking brake as claimed in claim 3, wherein the positively locking connection is a toothing arrangement.

5. A parking brake as claimed in claim 1, characterized in that the sealing element (10) is an O-ring or a fluid seal or a hose ring section.

6. A parking brake as claimed in claim 1, characterized in that a groove (7a) for holding the sealing element (10) is arranged in the brake caliper (7).

7. A parking brake as claimed in claim 1, characterized in that the sealing element (10) is arranged in the housing component.

8. A parking brake as claimed in claim 1, characterized in that the housing component (8) is arranged in a rotationally fixed fashion with respect to the brake caliper (7) by means of an anti-rotation device.

9. A parking brake as claimed in claim 8, wherein the anti-rotation device is a tappet (12) which protrudes axially and a correspondingly formed axial recess (13).

10. A parking brake as claimed in claim 1, wherein the output shaft (3) has a protruding end region (3a) which engages in a central opening (5a) in the spindle (5).

* * * * *

UNITED STATES PATENT AND TRADEMARK OFFICE
CERTIFICATE OF CORRECTION

PATENT NO. : 8,657,079 B2
APPLICATION NO. : 12/994962
DATED : February 25, 2014
INVENTOR(S) : Schemel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 214 days.

Signed and Sealed this
Twenty-ninth Day of September, 2015

Michelle K. Lee
*Director of the United States Patent and Trademark Office*